Patented June 19, 1928.

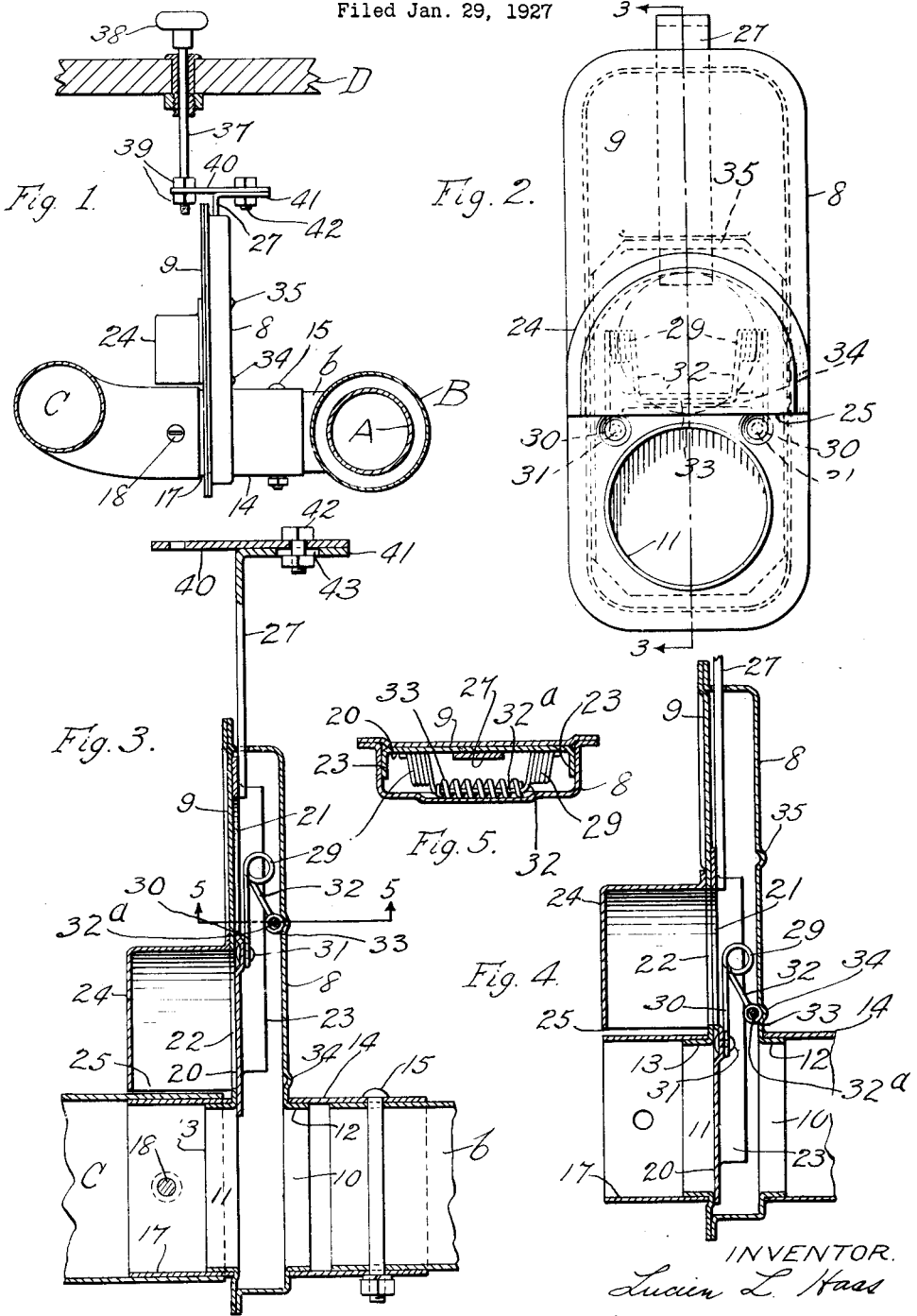

1,674,328

UNITED STATES PATENT OFFICE.

LUCIEN L. HAAS, OF BUFFALO, NEW YORK, ASSIGNOR TO BUFFALO PRESSED STEEL COMPANY, INC., OF BUFFALO, NEW YORK.

VALVE.

Application filed January 29, 1927. Serial No. 164,609.

This invention relates to valves and more particularly to valves intended for use in connection with hot air heaters for use in heating the interiors of vehicles.

The objects of this invention are to provide a valve of improved construction which may be set to one position for admitting warmed air to the interior of a vehicle and into another position to provide for the discharge of the warmed air to the atmosphere when not required in the interior of the vehicle; also to provide a valve of this kind with means for securely holding the various parts in their correct relation despite the vibration to which the valve is subjected when the vehicle is in use; also to improve the construction of valves of this kind so that the operation of the valve will not be interfered with by dirt or other foreign matter; also to improve the construction of valves of this kind in other respects hereinafter specified.

In the accompanying drawings:

Fig. 1 is a side view of a valve embodying this invention, the valve being shown arranged below the floor of a vehicle.

Fig. 2 is an elevation of the valve.

Fig. 3 is a sectional elevation thereof on line 3—3, Fig. 2.

Fig. 4 is a similar sectional elevation thereof showing the valve in its duct closing position.

Fig. 5 is a sectional plan view thereof on line 5—5, Fig. 3.

A in Fig. 1 represents an exhaust pipe of an engine and B a jacket surrounding the same, forming with the exhaust pipe a substantially annular space through which air to be heated is passed in any suitable manner. b represents a branch pipe or duct leading from the sleeve or jacket B to the valve, and C represents a pipe or duct leading from the valve to the portion of the vehicle to be heated. D represents the floor of the vehicle.

The valve for controlling the flow of hot air from the branch pipe or duct b to the pipe or duct C preferably includes a housing made of a dished or recessed housing member 8 and a cover plate 9 therefor, which may be suitably secured to the open end of the recessed housing 8. The housing 8 and cover plate 9 are preferably made of sheet metal stamped and formed into the desired shapes, although they may be made of other material, if desired. The housing and cover plate are provided with openings 10 and 11, preferably arranged opposite to each other, the opening 10 in the housing 8 being provided with an outwardly extending flange 12, and the opening 11 in the cover portion 9 being provided with an outwardly extending flange 13. A short tube or sleeve portion 14 is preferably secured to the flange 12 and is adapted to be connected with the branch pipe b of the jacket B in any suitable manner. In the particular construction shown, this branch pipe b extends into the short tube or sleeve 14, and a bolt 15 extending through holes in the sleeve and pipe serves to secure these two parts rigidly together. In a similar manner, a short sleeve or tube 17 is secured to the flange 13 of the cover 9 and the pipe C telescopes over the short tube 17 and is held in place by means of a bolt 18 or the like. Any other means for connecting the valve housing with the hot air inlet and discharge pipes may be employed.

When it is desired to heat the vehicle the valve is moved to a position in which the duct C is open and unobstructed and warm air from the branch pipe b will pass through the oppositely arranged holes or openings 10 and 11 in the parts 8 and 9 of the housing, and thence into the pipe C, from where it may be distributed to any desired part of the vehicle. If the interior of the vehicle becomes heated so that it is desired to interrupt this flow of heated air into the body of the vehicle, this can be done by moving a valve plate 20, arranged in the valve housing and preferably slidable in contact with the substantially flat cover portion 9 thereof, downwardly to close the hole 11 in the cover portion and cut off or obstruct the entrance of heated air to the duct C. In order to prevent the accumulation of hot air in the space between the jacket B and the exhaust pipe, when the valve 20 is in the latter position, from causing overheating of the exhaust pipe, means are provided for discharging or venting the heated air out of the housing of the valve when the opening 11 is closed, and for this purpose, in the particular construction shown, the plate 20 is provided with a hole or opening 21 which is adapted to register with a corresponding opening 22 in the cover plate 9 of the valve when the valve is in its duct closing position, as shown in Fig. 4, in which case the warm air entering from the branch pipe b through the hole 10 in the portion 8 of the housing passes upwardly through the lower, hollow portion of the housing and out of the same through the holes 21 and 22 respectively in the valve 20 and the cover plate 9, the hole 22 in the cover plate being open to the atmosphere underneath the floor D of the body of the vehicle. The valve plate or member 20 may be guided in its duct opening and duct closing and venting positions in any desired manner, for example the plate may be provided at opposite sides thereof with flanges 23 which extend along the opposite sides of the depression in the housing member 8, as is clearly shown in Fig. 5, and guide the valve plate in its movement. In order to prevent dirt and other foreign matter from entering into the housing of the valve and interfering with the operation thereof, a suitable cap or guard 24 is preferably placed over the opening 22 in the cover plate 9, this guard in the construction shown being substantially semi-circular in form and being open at its lower end, as indicated at 25 to permit heated air to be discharged therefrom. By arranging this guard 24 directly over a pipe, such as the pipe C, or the short pipe 17, the splashing of mud, water or other foreign matter upwardly into the guard is to a large extent prevented.

The valve plate 20 has a stem or extension 27 which extends out of the housing member 8 through a suitable opening therein through which the stem portion 27 of the valve may be moved into either operative position in any suitable or desired manner. Means are preferably provided for holding the valve yieldingly in either position and also for pressing the valve against a part of the housing to prevent rattling. In the particular construction shown, a spring is used for this purpose, which is made of a single piece of wire provided with two coils 29, the ends 30 of the wire being secured to the valve plate 20 in any suitable manner, for example, by means of rivets 31 extending through loops formed in the ends of the wire and through the valve plate. The inner ends of the two coils 29 terminate in arms 32 connected by a transverse part 32ª of the spring, around which an anti-friction roller or sleeve 33 is arranged, which may, if desired, be in the form of a coil of wire. The spring, acting through the roller 33, holds the valve plate 20 in either its duct opening or duct closing and venting position. For this purpose the portion 8 of the housing is provided with a pair of recesses 34 and 35 in which the roller 33 or other part of the spring may enter to yieldingly hold the valve plate in either position, the depression 35 being arranged so that when the spring roller has entered into this depression, the valve will be yieldingly held in its duct opening position, and the depression 34 being arranged so as to hold the valve in its duct closing and venting position. This spring in addition to holding the valve yieldingly in either operative position, also presses the valve against the cover plate 9 of the housing so as to form a tight closure with either of the holes 11 or 22 therein, and furthermore the spring prevents rattling of the valve member.

The actuation of the valve by raising or lowering the stem or part 27 secured thereto may be effected in any suitable or desired manner. In the particular construction shown this is done by means of a rod 37 extending through the floor D of the body of the vehicle, this rod 37 being connected with the stem 27 of the valve in any suitable manner to permit a certain amount of adjustment of the rod 37 relatively to the valve stem 27. The rod 37 is preferably provided at its upper end with a knob or handle 38 by means of which the rod may be raised and lowered and the lower end of the rod is connected in any suitable manner, for example, by means of nuts 39 engaging the lower threaded end of the valve adjusting rod to one end of a cross piece 40, the other end of which is secured to a laterally extending or bent arm 41 of the valve stem 27, by means of a bolt 42 which extends through a slot 43 in the arm 41. By means of this connection a considerable amount of adjustment can be effected between the valve adjusting rod 37 and the valve stem 27 since the connecting link or plate 40 may be swung about the axis of the bolt 42 and also may be adjusted relatively to the lateral extension 41 to the extent of the length of the slot 43. Consequently it is not necessary to aline the hole in the floor of the body of the vehicle through which the rod 37 projects with the handle portion 27 or the valve which is arranged beneath the floor. Other means for actuating the valve may, of course, be employed, if desired.

The valve described is simple and durable in construction and can be made entirely of sheet metal and affords an efficient closure for the warm air passage and also a vent or discharge for the warm air in case the passage to the interior of the vehicle is closed. The valve is self cleansing in that the lower edge of the movable valve member will scrape any deposit of dirt or foreign matter from the edges of the hole 11 and thus insure at all times a tight closure when the valve is in its duct closing and venting position.

I claim as my invention:—

1. A valve including a housing made of two parts one of which is recessed, said housing including an inlet, a discharge and a vent opening, a valve member slidable within said housing and bearing against an inner face thereof, said valve member being constructed to close said discharge opening when in one position and to close said vent opening when in another position to cause fluid entering said valve housing to pass either through said vent opening or through said discharge opening, means for normally holding said valve member against said face, and means in said housing which yieldingly hold said valve member either in the position in which said valve member closes said discharge opening or in the position in which said valve member closes said vent opening.

2. A valve including a housing made of two parts one of which is recessed, said housing including an inlet, a discharge and a vent opening, a valve member slidable within said housing and bearing against an inner face thereof, said valve member being constructed to close said discharge opening when in one position and to close said vent opening when in another position to cause fluid entering said valve housing to pass either through said vent opening or through said discharge opening, a spring secured to said valve member and slidably bearing against said valve housing to press said valve member against said face of said housing, and recesses in said housing into which a portion of said spring enters to yieldingly hold said valve member either in a position in which said member closes said discharge opening and opens said vent opening, or in a position in which said valve member closes said vent opening and opens said discharge opening.

3. A valve including a hollow housing having inlet and discharge openings and a vent opening, tubes connecting with said inlet and discharge openings, a valve member movable in said hollow housing and adapted to close either said vent opening or said discharge opening, and a guard arranged on the outside of said housing and over said vent opening and arranged above one of said tubes and having its opening facing said tube, to prevent the entrance of foreign matter into said vent opening.

4. A valve including a hollow housing having inlet, discharge and vent openings therein, a valve member slidably arranged in said housing and adapted to close either said discharge opening or said vent opening, a portion of said valve member extending out of said housing, a vertically adjustable rod connected with said valve member for actuating the same, and an adjustable connection between said rod and said valve member.

5. A valve for controlling the flow of heated air into the interior of a vehicle including a vertically movable valve member, a vertically adjustable rod extending through the floor of a vehicle, a substantially horizontal plate to one end of which said rod is connected and the other end of which is adjustably connected with said valve member.

6. A valve for controlling the supply of heated air to the interior of a vehicle and arranged below the floor of a vehicle, including a housing, a valve member slidable vertically in said housing, an adjusting rod extending through the floor of the vehicle, a substantially horizontal member to which the lower end of said rod is connected, said valve having a portion bent substantially parallel to said connecting member, and a pivotally and longitudinally adjustable connection between said connecting member and said bent portion of said valve.

7. A valve for controlling the flow of fluid, including a hollow housing having an opening therein, a valve member slidable in said housing to open and close said opening, a spring which holds said valve member in its operative position, and an antifriction roller connected with said spring and reducing the friction between said spring and a part of the valve with which said spring cooperates.

LUCIEN L. HAAS.